Figure 1:
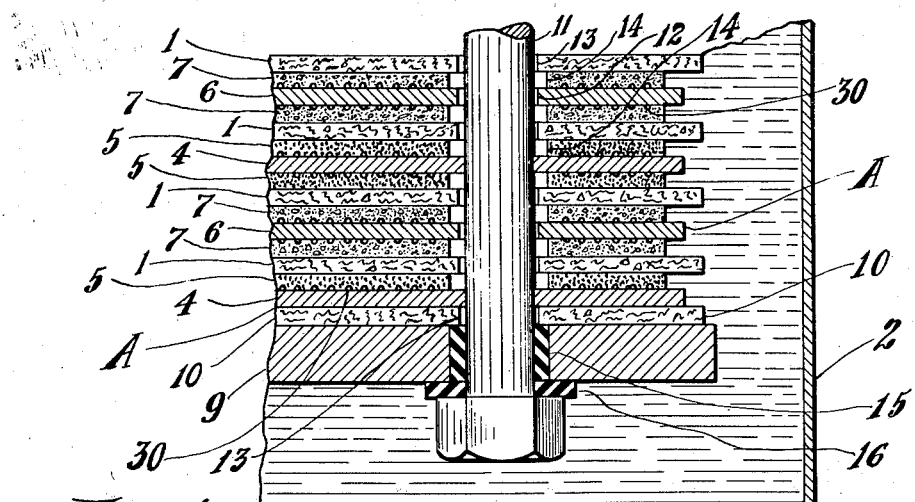

Feb. 17, 1925.

T. A. EDISON

STORAGE BATTERY

Filed March 12, 1924

1,526,326

INVENTOR
Thomas A. Edison
BY Henry Lanahan
ATTORNEY

Patented Feb. 17, 1925.

1,526,326

UNITED STATES PATENT OFFICE.

THOMAS A. EDISON, OF WEST ORANGE, NEW JERSEY.

STORAGE BATTERY.

REISSUED

Application filed March 12, 1924. Serial No. 698,633.

*To all whom it may concern:*

Be it known that I, THOMAS A. EDISON, a citizen of the United States, and a resident of West Orange, Essex County, New Jersey, have invented certain new and useful Improvements in Storage Batteries, of which the following is a description.

My invention relates to storage batteries and more particularly to storage battery cells having the same general characteristics as the cell disclosed in Patent No. 1,377,194, granted to me on May 10, 1921. Although designed especially for use in connection with Edison storage battery cells wherein nickel hydroxide is opposed to finely divided electrolytically active iron or oxide of iron in an alkaline solution as the electrolyte, it is to be distinctly understood that my invention is not limited in its application to cells of this type.

In the cell disclosed in the patent referred to, a battery pile of special construction is employed in the place of the usual plate assembly in Edison storage battery cells. This battery pile comprises a series of very thin conductive contact sheets, preferably of nickel, separated by insulating sheets of asbestos paper, with thin flat layers of finely divided active material respectively disposed between the surfaces of each of the nickel sheets and the adjacent asbestos sheets, the whole being held together under great pressure with the layers of active material in firm, close surface contact with the respective nickel sheets. The layers of active material for the negative elements, preferably consist of electrolytically finely divided iron or oxide of iron, preferably mixed with a small amount of mercury, and the layers of active material for the positive elements preferably consist of finely divided nickel hydroxide. Other suitable active materials may, however, be employed instead of the finely divided iron and nickel hydroxide; for example, in place of finely divided iron as the active material for the negative elements, finely divided cadmium or cobalt may be employed; and in place of nickel hydroxide as the active material for the positive elements, an oxide of cobalt may be employed.

In making up a battery pile such as that described above, I have heretofore proceeded as follows: The asbestos insulating sheets used in the battery pile were first coated on one side with a thin layer of finely divided iron or oxide of iron, and on the other side with a thin layer of nickel hydroxide. These coated asbestos sheets were then subjected to enormous pressure so as to compact the layers of active material and form the same with very smooth flat surfaces. The proper number of coated asbestos sheets were then superimposed with one of the thin nickel contact sheets between each two adjacent asbestos sheets in such a manner that one of each two adjacent nickel sheets was engaged on each side with a layer of the electrolytically active iron or oxide of iron and the other was engaged on each side with a layer of the electrolytically active nickel hydroxide, so as to form a pile with electrode elements which were alternately negative and positive. This superimposed pile was then subjected to great pressure and secured together under pressure by means of heavy clamping or pressure plates at either end of the pile and two bolts or rods extending through the clamping plates and also through the elements of the pile and nuts threaded on said rods. These rods served as the poles of the battery pile, for one of said rods contacted only the contact sheets of the negative electrode elements of the pile and the other of said rods contacted only the contact sheets of the positive electrode elements of the pile. This was accomplished by providing the contact sheets of each electrode element with two openings through which the said rods respectively extended, the opening for one rod being of such size that the rod fitted very closely therein, and the opening for the other rod being of somewhat greater size so that the rod which extended therethrough was spaced from the wall of such opening.

I find, however, that cells constructed as above described become unduly heated both on charge and discharge, that the capacity of such cells, especially at high discharge rates, is considerably below that which should be obtained, and that the capacity decreases to some extent with the length of time the cells are in use. I believe these conditions to be correctly explained as follows: In cells so constructed the surface contact of the nickel conductive sheets and the layers of active material engaging the same is so close and said layers of active material are so compacted because of the great pressure to which said layers were subjected in forming the battery piles, and also because of the pressure under which the piles are maintained, that it is extremely difficult for any appreciable amount of the electrolyte to gain access to the layers of active material except such portions thereof as are directly exposed to or closely adjacent the body of the electrolyte in the cells. Moreover, the internal resistance and heating of such cells, both on charge and discharge, are materially increased by osmotic action. This action takes place in the direction of the flow of current and when the cells are on charge has the effect of driving the small amount of electrolyte which might otherwise reach those portions of the layers of active material of the positive electrode elements which are remote from the body of the electrolyte, away from the adjacent surface portions of the nickel contact sheets of such elements, while when the cells are discharged it has the effect of driving the elecrolyte which might otherwise reach the corresponding portions of the layers of active material of the negative elements, away from the adjacent surface portions of the nickel contact sheets of these elements. When the electrolyte is thus driven away from the nickel contact sheets of the electrode elements, the adjacent active material is rendered practically dry and as such material is a very poor conductor when dry, the electrical resistance thereof and the internal resistance of the cells will thereupon be greatly increased. That the foregoing explanation is correct is substantiated, in part at least, by examinations which I have made of cells of the type described after the same have been in use, which examinations show the active material adjacent the edges of the different layers thereof to be fully formed and the material remote from the edges of the said layers to be either only partially formed or in such condition that it is clear that such material was not being acted on by the electrolyte. It is therefore obvious that in such cells the circulation of the electrolyte and the access thereof to all portions of the various layers of active material were so impaired that in the operation of the cells, a large portion of the active material was inactive or only partially active.

The principal object of my invention is to obviate the foregoing objections by the provision of an improved arrangement and construction, especially in the type of cells above described, for so improving or increasing the circulation of the electrolyte as to insure a constant and copious supply of electrolyte to all portions of the various layers of active material of the electrode elements both on charge and discharge.

I have discovered that the foregoing object may be attained to a marked degree in a cell such as described, by providing those surfaces of the layers of active material which are adjacent the nickel sheets, or other conductive contact sheets, with suitably formed grooves which are properly arranged in the cell. These grooves are preferably formed in the surfaces of the layers of active material by the use of suitably shaped dies when subjecting the asbestos sheets coated with such layers to the heavy initial pressure, prior to assembling the battery pile.

Other objects and features of my invention will be hereinafter more fully described and claimed.

Figure 2:
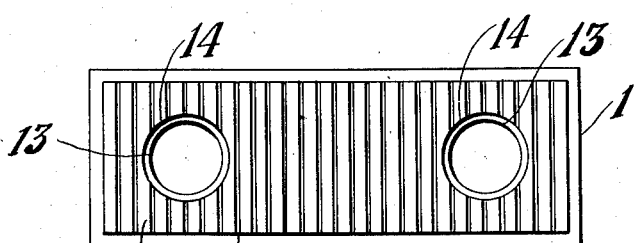
Figure 3:
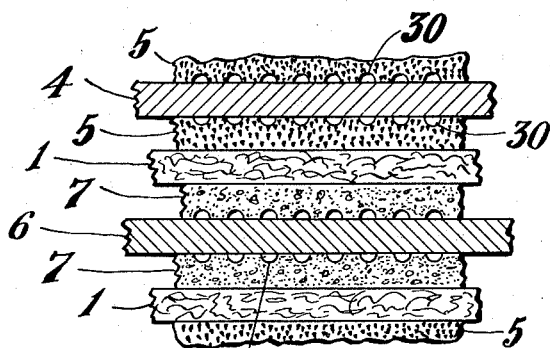

In order that my invention may be more clearly understood, attention is directed to the drawing accompanying and forming a part of this specification and in which Figure 1 is an enlarged, fragmental sectional view of a storage battery cell of the type disclosed in my Patent No. 1,377,194 referred to above;

Figure 2 is a plan view of one of the coated asbestos insulating sheets prior to the assembly thereof in the battery pile; and Figure 3 is an enlarged sectional view of a number of the elements in the battery pile.

Referring to the drawing, reference character 1 represents the asbestos insulating and separating sheets which are disposed between the adjacent negative and positive electrode elements of the battery pile. Prior to the assembly of the pile each of a plurality of these asbestos sheets is coated on one side or face with electrolytically active finely divided iron and on the opposite side or face with finely divided nickel hydroxide. Each of the coated sheets is then subjected between a pair of dies to a pressure of several thousand pounds per square inch. The faces of these dies are preferably provided with similar series of ribs or ridges, and in using the dies the same are arranged with the corresponding ribs or ridges thereof in alignment so that in subjecting the coated sheet to pressure therebetween, as described, substantially the entire surface portions of the layers of active material on the sheet will have impressed or formed therein similar series of closely spaced grooves 30 of shallow depth with the corresponding grooves in the said layers in alignment. The grooves of each series are preferably parallel and preferably extend in the direction of the narrow dimension of the coated sheet, where the latter is rectangular in shape, as shown in Figure 2. If desired, however, additional grooves extending lengthwise of the coated sheet and intersecting the grooves shown, may be provided, and, especially where the coated sheets differ in shape from those shown, series of grooves of various other arrangements may be used. A plurality of coated asbestos sheets after being subjected to the pressure and grooved as described, together with a plurality of thin contact sheets, preferably formed of nickel, are then assembled into a battery pile A, with the corresponding grooves 30 in the various layers of active material in alignment. The battery pile A comprises a plurality of superposed and alternately arranged negative and positive electrode elements, each of the negative elements consisting of a thin contact sheet or foil 4, preferably of nickel, and two layers 5 of electrolytically active finely divided iron respectively disposed on opposite sides of the sheet or foil 4; and each of the positive elements consisting of a thin contact sheet or foil 6, similar to the sheets or foils 4 of the negative elements, and two thin layers 7 of finely divided nickel hydroxide respectively disposed on opposite sides of the sheet or foil 6 and in contact therewith. The insulating sheets of asbestos paper are respectively disposed between the negative and positive elements, each of these sheets being, of course, coated on one side with a layer 5 of finely divided iron which is in contact with the adjacent thin nickel sheet or foil 4, and on its other side with a layer 7 of nickel hydroxide which is in contact with the adjacent nickel sheet or foil 6. Strong heavy nickel-plated pressure plates are respectively disposed at the opposite ends of the superposed negative and positive elements, only one of these plates, indicated by reference character 9, being shown. The contact sheet or foil 4 of each of the outermost negative elements is not in contact at its outer surface with a layer of finely divided iron but is merely separated and insulated from the adjacent pressure plate by an uncoated insulating sheet 10. Reference character 11 represents one of the two rods or poles which extend through the elements of the battery pile and the pressure plates to hold the pile assembled. The rod or pole 11 shown is the negative pole and fits closely against the wall of the opening provided therefor in each of the contact sheets 4 of the negative electrode elements, but the opening 12 provided in each of the contact sheets 6 of the positive electrode elements for said pole 11 is of such size that the pole will be spaced from the wall of this opening as clearly shown in Figure 1. The asbestos sheets 1 and 10 and the layers of active material 5 and 7 are also provided with openings 13 and 14 through which the poles extend and which are of such size that the poles will not contact the walls of these openings. The openings in the contact sheets 6 for the positive pole, not shown, will, of course, be of such size that the positive pole will closely engage the walls of these openings, while the openings in the contact sheets 4 of the negative electrode elements provided for the reception of the positive pole will be of such size that said pole will not engage the walls thereof. Each of the rods or poles is insulated from each of the pressure plates at the end of the battery pile by a hard hubber bushing 15 and a hard rubber washer 16.

In a cell such as shown and described, the grooves 30 in the faces of the layers of active material which are adjacent the contact sheets 4 and 6 provide means whereby the electrolyte 3, may readily circulate through the battery pile and gain access to all portions of the active material without it being necessary for the electrolyte to work its way through the active material for any great distance. Therefore in the operation of the cell, there will be a sufficiently free and rapid circulation of the electrolyte to ensure a constant and copious supply thereof to all portions of the active material. Accordingly substantially all of the active material will be fully formed soon after the cell is put into operation, and thereafter practically all of such material will be active. Moreover because of the improved circulation of the electrolyte, the deleterious effects of osmotic action are largely obviated and the heat generated in the battery pile is dissipated more rapidly and effectively. In a battery cell embodying the present invention, the internal resistance is reduced, the capacity, especially at high discharge rates is greater, and the cell is generally more efficient in operation.

It is to be understood that my invention is not limited to the particular manner of grooving the layers of active material shown and described herein, but that the construction shown is merely illustrative and is subject to various changes and modifications without departure from the spirit of my invention and the scope of the appended claims.

Having now described my invention, what I claim as new and desire to protect by Letters Patent is as follows:

1. In a storage battery cell, a conductive member, an insulating member and a layer of active material between said members, the surface of said layer adjacent the conductive member being grooved, substantially as described.

2. In a storage battery cell, a conductive member, an insulating member and a layer of active material between said members, the surface of said layer adjacent the conductive member being provided with a series of spaced shallow grooves, substantially as described.

3. In a storage battery cell, a conductive member, an insulating member and a layer of active material between said members, the surface of said layer adjacent the conductive member being grooved, and means for securing said members together whereby the active material is maintained under pressure firmly in engagement with said conductive member, substantially as described.

4. In a storage battery cell, a conductive member, an insulating member and a layer of active material between said members, the surface of said layer adjacent the conductive member being provided with a series of spaced grooves, and means securing said members together whereby the portions of the active material between the grooves in said layer are maintained under pressure firmly in engagement with said conductive member, substantially as described.

5. In a storage battery cell, a plurality of alternately disposed positive and negative elements, each of said elements comprising a conductive sheet and a layer of finely divided active material engaging said sheet, the surfaces of the layers of active material adjacent the conductive sheets being provided with similar series of grooves, and the corresponding grooves in said layers being in alignment, substantially as described.

6. In a storage battery cell, a plurality of alternately disposed positive and negative elements, each of said elements comprising a conductive sheet and layers of finely divided active material respectively engaging the opposite surfaces of said sheet, the surfaces of said layers of active material adjacent said sheet being provided with similar series of grooves, the corresponding grooves of the two layers of active material engaging said sheet being in alignment, substantially as described.

7. In a storage battery cell, a flat conductive member, an insulating member and a layer of active material between said members, the surface of said layer adjacent the conductive member being provided with a series of spaced parallel grooves, and means securing said members together whereby the portions of the active material between the grooves therein are maintained under pressure firmly in engagement with said conductive member, substantially as described.

8. In a storage battery cell, a plurality of alternately disposed positive and negative elements, each of said elements comprising a conductive sheet and layers of finely divided active material maintained under pressure firmly in contact with the opposite surfaces of said sheet respectively, the surface of each of said layers of active material adjacent said sheet being provided with a series of spaced grooves, substantially as described.

This specification signed this 25th day of February, 1924.

THOS A EDISON.